United States Patent
Kay et al.

(10) Patent No.: US 6,430,602 B1
(45) Date of Patent: Aug. 6, 2002

(54) METHOD AND SYSTEM FOR INTERACTIVELY RESPONDING TO INSTANT MESSAGING REQUESTS

(75) Inventors: Timothy Kay, Los Altos, CA (US); Robert Hoffer, Allendale, NJ (US)

(73) Assignee: Active Buddy, Inc., New York, NY (US)

( * ) Notice: Subject to any disclaimer, the term of this patent is extended or adjusted under 35 U.S.C. 154(b) by 34 days.

(21) Appl. No.: 09/643,262

(22) Filed: Aug. 22, 2000

(51) Int. Cl.[7] .............................................. G06F 15/16
(52) U.S. Cl. ........................ 709/206; 709/104; 709/105; 709/202; 709/207; 709/225; 709/226; 707/3; 707/4; 707/5; 707/9; 707/10
(58) Field of Search ................................ 709/102, 104, 709/105, 202, 206, 207, 225, 226; 707/3, 4, 5, 9, 10

(56) References Cited

U.S. PATENT DOCUMENTS

| | | | | |
|---|---|---|---|---|
| 5,894,556 A | * | 4/1999 | Grimm et al. ................ 463/42 |
| 5,951,694 A | * | 9/1999 | Choquier et al. ............. 714/15 |
| 5,978,799 A | * | 11/1999 | Hirsch ............................ 707/4 |
| 6,023,510 A | * | 2/2000 | Epstein ........................ 380/25 |
| 6,260,041 B1 | * | 7/2001 | Gonzalez et al. ............. 707/10 |
| 6,289,390 B1 | * | 9/2001 | Kavner ....................... 709/310 |
| 6,301,609 B1 | * | 10/2001 | Aravamudan et al. ...... 709/207 |
| 6,332,141 B2 | * | 12/2001 | Gonzalez et al. ............. 707/10 |

* cited by examiner

*Primary Examiner*—Saleh Najjar
(74) *Attorney, Agent, or Firm*—Darby & Darby

(57) ABSTRACT

A method and system for interactively responding to queries from a remotely located user includes a computer server system configured to receiving an instant message query or request from the user over the Internet. The query or request is interpreted and appropriate action is taken, such as accessing a local or remote data resource and formulating an answer to the user's query. The answer is formatted as appropriate and returned to the user as an instant message or via another route specified by the user. A method and system of providing authenticated access to a given web page via instant messaging is also disclosed.

53 Claims, 7 Drawing Sheets

LINK EXAMPLE:
http://www.activebuddy.com/edit?secret=ajsoebo193xmcielq;c

METHOD AND SYSTEM FOR INTERACTIVELY RESPONDING TO INSTANT MESSAGING REQUESTS

FIELD OF THE INVENTION

This invention is directed to a method and system for autonomously processing requests from remotely located users. More particularly, this invention is directed to a method and system for acting on requests and queries received from remotely located users using an instant messaging protocol.

BACKGROUND OF THE INVENTION

Internet users are well versed in accessing the Internet using widely available web browsing software to search for desired information. The web browser software permits users to access various automated search engines and, by entering appropriate queries, identify web pages which may contain the information of interest. While a wide variety of information is available in this manner, most web pages are directed to specific types of information. As a result, users who are seeking information in various diverse topics will often need to locate and access multiple, and perhaps unrelated, web pages.

While users can find a great deal of in-depth information regarding particular topics, it can often be very difficult to obtain answers to short and specific questions due to the overwhelming number of web pages which will be identified in conventional indexing and search engine-based systems.

Various efforts have been made to aggregate diverse information onto one or a few web pages. However, these aggregated sites are often maintained by individual users as "personal web pages" and are thus of questionable reliability. Although some commercial web sites have been implemented for the purpose of aggregating information, these sites generally compete among each other for users and thus include many graphical features and expanded functionality to increase the site's attractiveness. However, this additional functionality also makes these sites more cumbersome and slow to access and use because of the additional data and processing overhead.

Another widely used Internet application is instant messaging ("IM"). IM services of one form or another are in use by an estimated 70 million people or more. Unlike Internet browsing software, which is used to access various web pages, IM is primarily used by a subscriber to "chat" with one or more other IM users. To access an IM service, a user registers with a service provider and, after connecting to the Internet (or other appropriate data network), enter their screen name and password to log in to the IM network. Popular IM applications include AOL's Instant Messenger and Microsoft's Network Messenger services. Once a user has logged in to the appropriate IM network, his presence on the system is made known to all authorized partners (commonly termed "buddies"). The user can then engage in typed conversations with other IM users connected to the system.

Because IM is a text-based service, instant messaging communication is generally not burdened by the need to transfer large graphic, sound, or program files. As a result, instant messaging is a relatively quick and easy to use system. However, while instant messaging is widely available, its value as a means to access and retrieve data from a remotely located automated system has not been fully appreciated. Accordingly, it is an object of the invention to provide a instant messaging based system which interactively responds to and services requests from a remotely located users. Such requests can include queries for general or specific information, requests to access and control various "WEB-enabled" devices, requests to store or information for later use, reminder and paging services, as well as additional request-based functionality, such as suitable for use in various e-commerce environments.

Users of IM services often simultaneously use Internet browsers to access web pages. It is not uncommon for an IM user to forward a link to a web page of interest via the IM service to another user. However, if the indicated web page contains sensitive information, a user subsequently following the link to access the web page may be required to enter a username and password. Even though the user has already signed in to the IM service, and thus is already authenticated, the accessed web site generally has no knowledge of this authentication.

It is thus a further object of the invention to provide a method and system for granting authenticated access to a web page which leverages the authentication mechanism present in a concurrently operating IM service. Such a secured access system is suitable for use in an IM-based request servicing system to enable authenticated access to user profile web pages where a user can easily enter or retrieve large volumes of information, fill out forms, or engage in other activities which can be cumbersome at best when implemented in an instant messaging environment.

SUMMARY OF THE INVENTION

These and other objects are achieved through the use of a method and system for interactively responding to requests sent as instant messages from a user. The system includes a message server which is connected to a data network through an instant messaging port. The server is logged in to the IM network and assigned a designated screen-name, such as "ACTIVEBUDDY". When the message server receives an IM message from a user, the message is processed to determine the type of request made by the user and the appropriate actions necessary to service the request. In one embodiment, the request is an informational query. In response to such a request, the message server directs the query to an appropriate query response server, which server will interpret the request and return a suitable answer. The query response server(s) can be local to the message processing server or remotely accessed, e.g., via the Internet. The received answer is embedded in a message which is returned to the user, preferably over the IM system. Alternatively, the message server can interpret the request directly using various natural language processing techniques known to those skilled in the art. In one configuration, a table of query patterns is provided and the table is searched to identify the pattern which most closely matches the received request. A designated local or remotely located resource is then accessed to determine an answer for the query, which answer is returned to the user.

It will be appreciated that, in order to generate an accurate answer to many types of queries, additional or secondary information may be required to fill in unstated assumptions in the query. To aid in providing this information, a user profile can be maintained by the system in which commonly needed information is stored. The types of information suitable for placement in the profile include static data such as the user's birth date, place of residence, fairly static information, such as stock portfolio data, and dynamic information, such as information gleaned from the prior most recent communications with the user. When the system determines that additional information is required, either by processing the request directly or in response to a message forwarded by a query response system indicating that more data is needed to process the request, the information is retrieved from the profile.

If the needed additional information is not already present in the user's profile and cannot be reasonably determined through other intermediate data searches, the user can be solicited to provide the additional information. Such solicitation can be through a query message sent to the user over the IM network or by means of a message instructing the user to access and update their profile via a designated web site. After the additional data is received from the user, the original query is reprocessed with the additional data and the result is returned to the user. The additional data can be stored in the user's profile for use in the future. In addition, information extracted from a prior request or provided in an answer can also be stored in the user profile for at least a predetermined period of time to permit the user to ask a series of questions or make a series of request related to a particular item without having to specify the same item in every request. For example, a user can issue a query asking the local time in New York City; In a following query, the user can simply ask "What is the weather today?" The object of the first request (New York) is used to process the second request. Processing and reusing data in this way makes the resulting text dialog appear more natural and simplifies use of the system.

During the course of one or more requests, it may become necessary to ask a user to enter a large amount of information or take another action which is easier to perform in an Internet browser environment. According to a further aspect of the invention, a method and system is also provided to allow authenticated access to a particular web page by directing the user to that page using a link which is provided in an instant message. When a user is to be given authenticated accessed to a web page, the system generates an access key, which can be, for example, a random number of a suitable length. A uniform resource locator ("URL") is then generated which includes the key and which is associated with the selected web page.

The key-containing URL is forwarded to the user in a message using the instant messaging protocol. When the user receives the message, the user can click on (or otherwise select) the URL to activate their web browser and direct it to the designated location. When the system receives a request for access to a web page, the specified URL is parsed to extract an embedded key. This key is then used to identify the particular web page to which the user has been granted access and the web page is served to the user. To increase security of the system, the various keys can expire after a short period of time and also after they are used once to access a web page. Advantageously, this technique leverages the authentication mechanism of the instant messaging system by granting access to the designated web pages only to users who have successfully logged in to an instant messaging service. As a result, the user does not need to divulge their IM password or remember another user ID and password combination. In addition, because the web page/key association expires after a single use and in a designated period of time in any case, it is highly unlikely that the key could be intercepted and used by an unauthorized party during its validity period and without detection.

BRIEF DESCRIPTION OF THE DRAWINGS

The foregoing and other features of the present invention will be more readily apparent from the following detailed description and drawings of the illustrative embodiments of the invention in which.

DETAILED DESCRIPTION OF THE PREFERRED EMBODIMENTS

Figure 1:
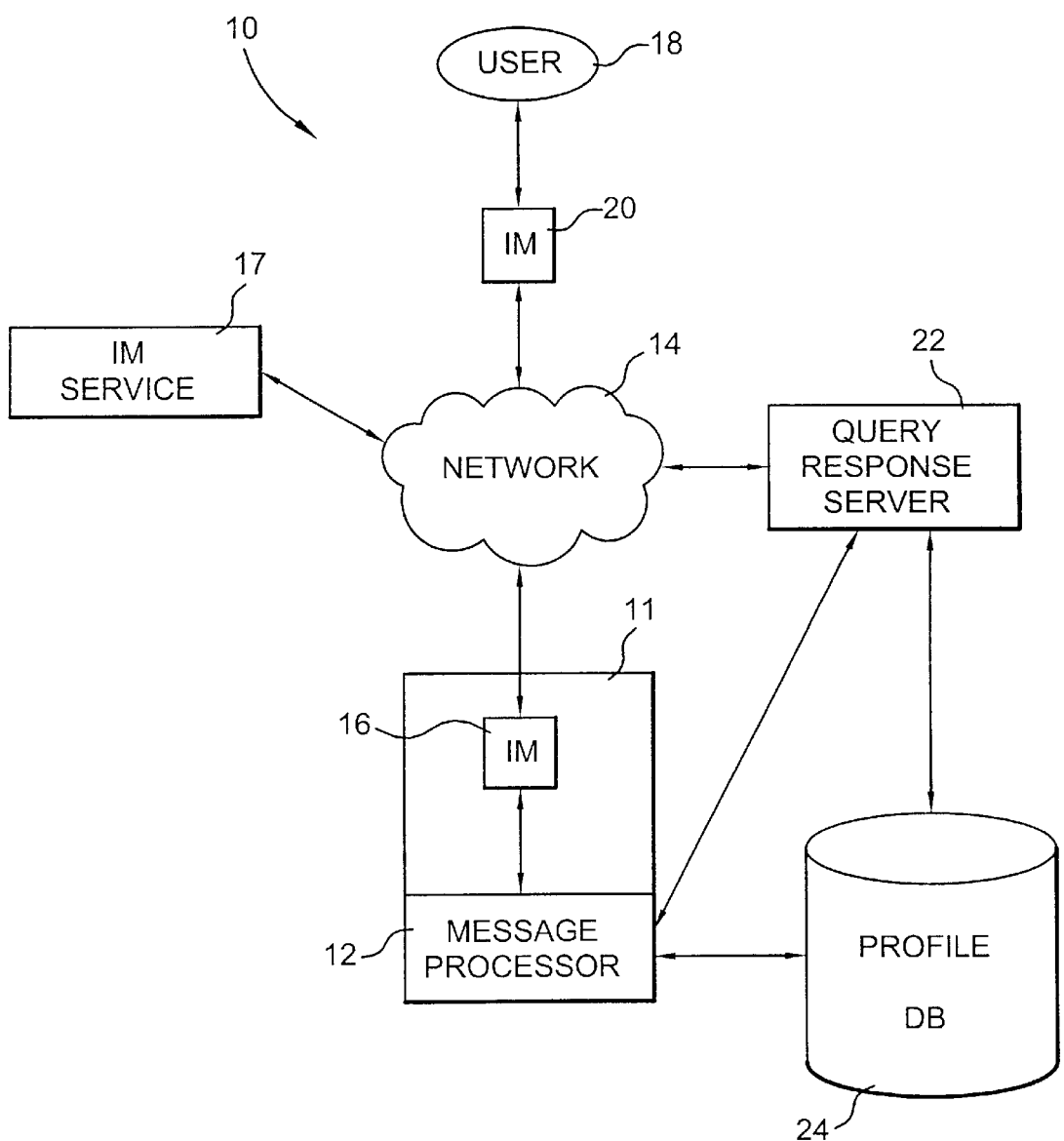
FIG. 1 shows a high level block diagram of a first embodiment of a system implementing various aspects of the invention.

Turning to FIG. 1 there is shown a block diagram of a system 10 for interactively responding to requests or queries from a remotely located user. The system comprises a message router 11 which includes message processor 12. Processor 12 is coupled to a data network 14 and is logged in as a user of an instant messaging service provider 17 through an appropriate IM application or routine 16. A user 18 is connected to the network 14 and the IM service provider 17 through an instant messaging gateway 20. The instant messaging gateway 20 will typically be provided by an IM service provider to which the user has subscribed and allows access to the IM system after the user has logged in. The IM application 16 between message processor 12 and the network 14 is configured to enable access to the appropriate IM service provider(s). To provide instant messaging communication between message processor 12 and a plurality of users, which users may subscribe to different instant messaging providers, it may be necessary for message processor 12 to connect to a number of different IM service providers 17 through different gateways 16 or via a single IM protocol gateway 16 with several I/O processing routines to address situations where various messaging service providers do not share a data common protocol.

In an instant messaging environment, each user is provided with a unique screen name which is included as part of a message sent from the user to a designated destination. To direct a query or other request to messaging processor 12, a user, after logging sends an instant message containing the request to the screen name assigned to the message processor 12, such as "ACTIVEBUDDY." The message processor 12 is logged into the IM system and the IM system directs the message through the network to the processor 12.

When message processor 12 receives a request from the user, the screen name of the user is stored and, in this embodiment, the request, is forwarded to a local or remotely located query response server, 22. In practice, query response server 22 will include a natural language interpreter or other smart system which is capable of responding to queries and other request of an arbitrary nature related to topics within at least a specified range of issues by generating an appropriate answer. The answer generated by query response server 22 is returned to the message processor 12 where it is incorporated into an output message which is subsequently sent to the user through the IM network. Alternatively, or in addition, the output message can be forwarded to the user through any other designated means, including e-mail, fax, text messaging to wireless or hand-held devices, voice mail (via a text to speech output system), or any other type of messaging system specified by the user.

Various types of information received during the query response interaction can be stored for later use in a user profile database 24 which contain various user profiles associated which each user. The profiles can be keyed to a user screen name in combination with the name of the instant messaging provider, for example "john@aol". The profile database 24 is preferably maintained on a separate server which is accessible to both message processor 12 and query response server 22, although other data storage configurations are feasible. By storing data provided by the user during a profile set up session and/or in response to data solicitation requests, a sophisticated query system can be provided which can make use of secondary or implied information to return a response which is more accurate or based on implicit data which need not be entered by the user in each query.

For example, a user may issue a query "What is the weather in Sunnyvale?" The query response server would process this query, determine the most likely "Sunnyvale" based on available information about the user, and access a suitable Internet weather resource to obtain the weather report for, e.g., Sunnyvale, Calif. In addition, the user's profile can be dynamically updated with the location Sunnyvale. As a result, a default location (if one was not already present) is available for use in subsequent location-dependent queries where the user does not specify a location. For example, the user may subsequently issue the query "Are there any outdoor concerts today?". In order to accurately answer this question, the query response server 22 must know a general geographic location. In this embodiment, the system could use the most recently mentioned geographic location, Sunnyvale, as the location for the search.

It will be appreciated that a large amount of default information can be provided in the user profile, such as a user age, or birth date, sex, place of residence, athletic teams of interest, stock portfolio information, etc. Because of the large quantity of information which can potentially be stored in the user profile, when a query from a user without a profile is detected, a "new user" procedure can be initiated in which the user is requested to provide various types of information to be stored in the user profile. In one embodiment, the user is directed to a specified profile web page in to which they can enter the various types of requested data. A most preferred method of directing the user to a web page is discussed in more detail below. In a more preferred embodiment, a user's profile is dynamically generated using information which is extracted from communications with the user, such as user-initiated queries.

Figure 2:
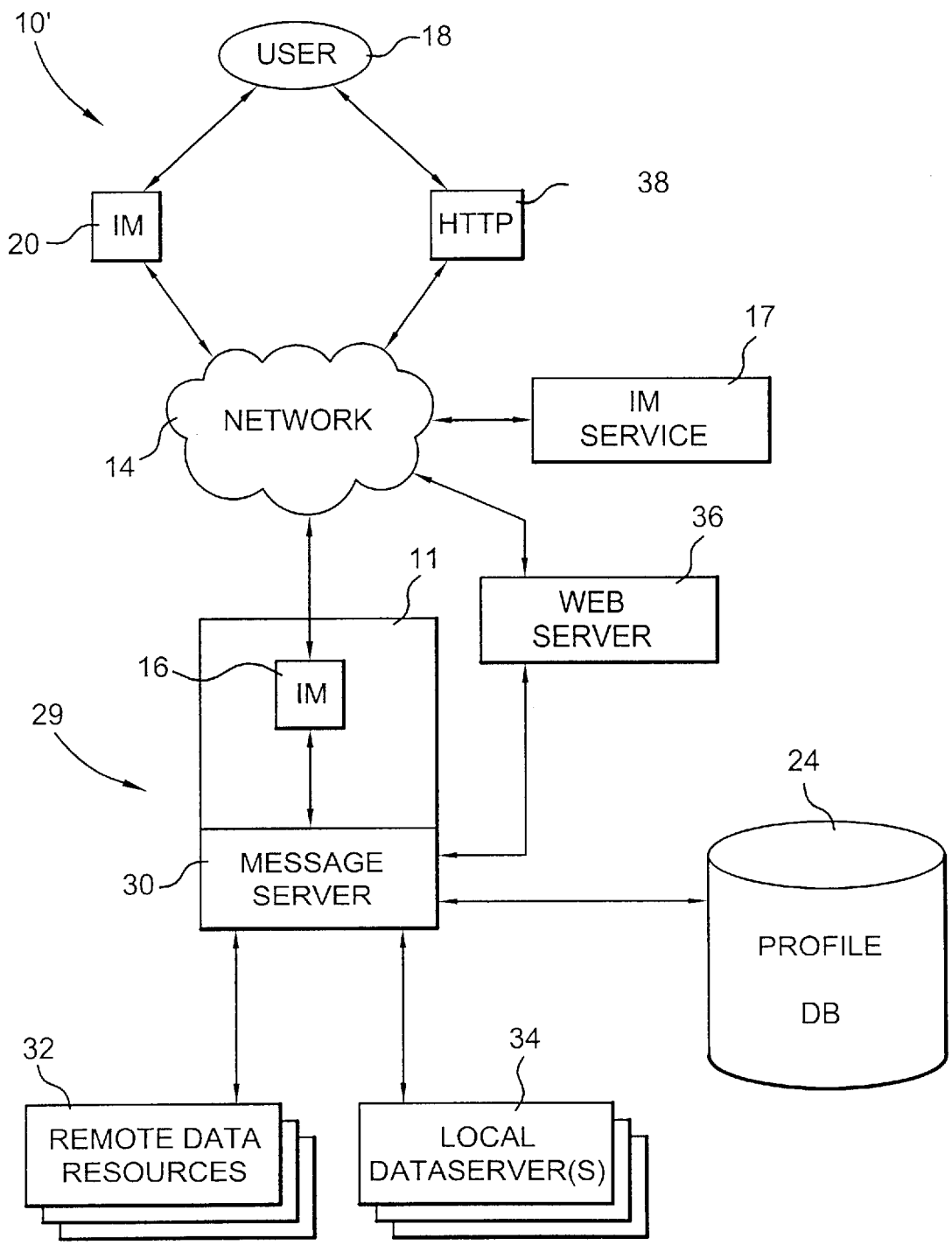
FIG. 2 is a block diagram of a second embodiment of a system implementing various aspects of the present invention.

Turning to FIG. 2 there is shown a block diagram of a system 10' according to a second embodiment of the invention. This embodiment is generally similar to the embodiment of FIG. 1 in that a message router 29 is provided which includes a message server 30 for responding A to user's requests and which is connected to IM service 17 through a gateway 16. One primary difference is that the functionality of a separate query response server 22 of FIG. 1 is included within a local message server 30 such that query processing is not outsourced as a matter of course. Message server 30 is connected to the profile database 24 and also to a series of remote and local data resources 32, 34. In addition server 30 can be configured to access network 14 using multiple data protocols in addition to an IM, protocol, and in particular, a hyper-text transfer protocol ("HTTP") link via web server 36, which protocol is the dominant form of data messaging used by Internet web browsers. Also shown in FIG. 2 is a similar web browser interface 38 available to user 18.

As discussed more fully below relative to the flow chart of FIG. 4, message server 30 interprets a message containing a query or other request received from the user over the IM gateway 16 and accesses the appropriate data resource to fulfill the request. The type of data resource accessed depends on the information needed or the action requested. For example, various types of static information may be locally stored. Information of this type can include, for example, a zip code and area code look up databases, measurement conversions, and various geographic databases, such as a mapping or direction system. A local partially or fully cached version of a remote database can also be provided. Data suitable for storage in a local cached copy of a remote database includes information which changes relatively infrequently, and thus would only need to be updated on a periodic basis, not continuously. Examples of data of this type include geographic and political information and entertainment history. For data which is continuously updated, the server is preferably connected to remote data resources through, for example, the Internet, to allow retrieval of up-to-date information. Data which is best suited for retrieval from such remote resources includes package tracking, stock prices, airline flight status, and weather. As will be recognized, the remote data resources may have different access protocols. Thus, a number of different access application programs may be required in order to properly format an appropriate query to the resource and properly process the received reply. In one particular embodiment, the message server 30 processes a received request at least sufficiently to identify the appropriate data resource to query and formats the data access request accordingly. As will be recognized by those of skill in the art, various intermediate levels of request interpretation, query generation and processing, etc., can also be performed.

Figure 3:
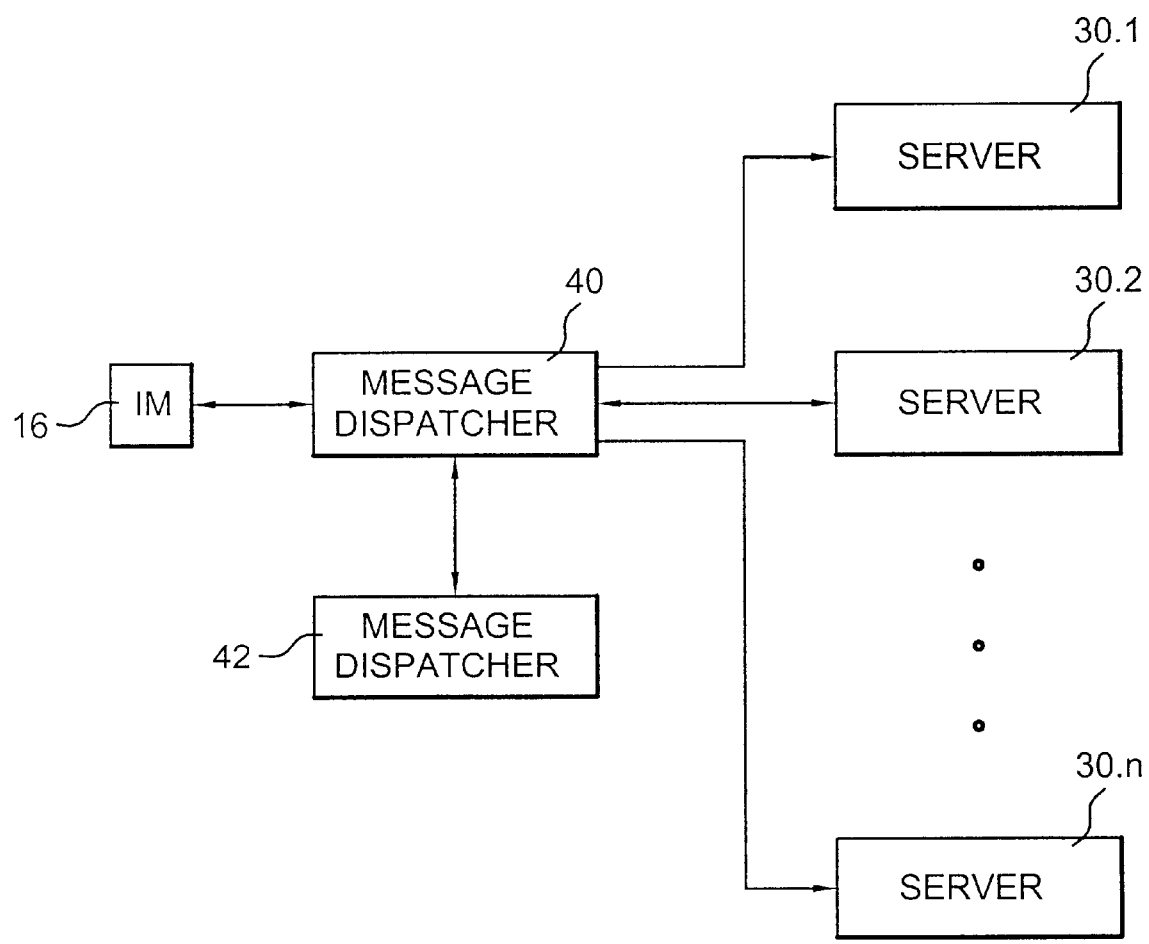
FIG. 3 is a block of a message routing system for use in the present invention.

In operation, a large number of requests or queries can be pending for many users at the same time. Thus a larger number of separate "conversations" may be ongoing. In order to increase the system response time and decrease the load on any particular server, preferably the incoming and outgoing instant messaging data stream is handled by a message router and forwarded to a plurality of servers 30. 1 through 30. N as illustrated in FIG. 3. In one embodiment, the message dispatcher 40 maintains a table 42 of active users associated with each server (a user-server association table). When a message is received from a user not currently in the user-server table 42, that user is assigned to a server and placed in the user-server table, e. g., on a lowest load basis such that the server with the lowest number of active users is assigned the new users. Then, as data packets are received from the user through the instant messaging gateway 16, the data packets are processed by the message dispatcher 40 and routed to an appropriate server according to the user-server association table 42.

Advantageously, such a message dispatching system can be configured so that each server 30.x believes itself to be the only server in the system and is unaware of the intervening message router 40. In addition, the system can be configured so that the entire system or server 30.1 through 30.N appears to a user under the single screen name used by the system 10 (or 10'). This arrangement simplifies the addition of and removal of servers 30.x to the system without substantial reconfiguration being required. Various techniques for configuring a message router 40 will be known to those of skilled in the art. Preferably, the dispatcher 40 and user-server association table 42 are controlled with a suitable load balancing algorithm to evenly distribute the request load across the available server base in response to varying usage conditions.

Figure 4:
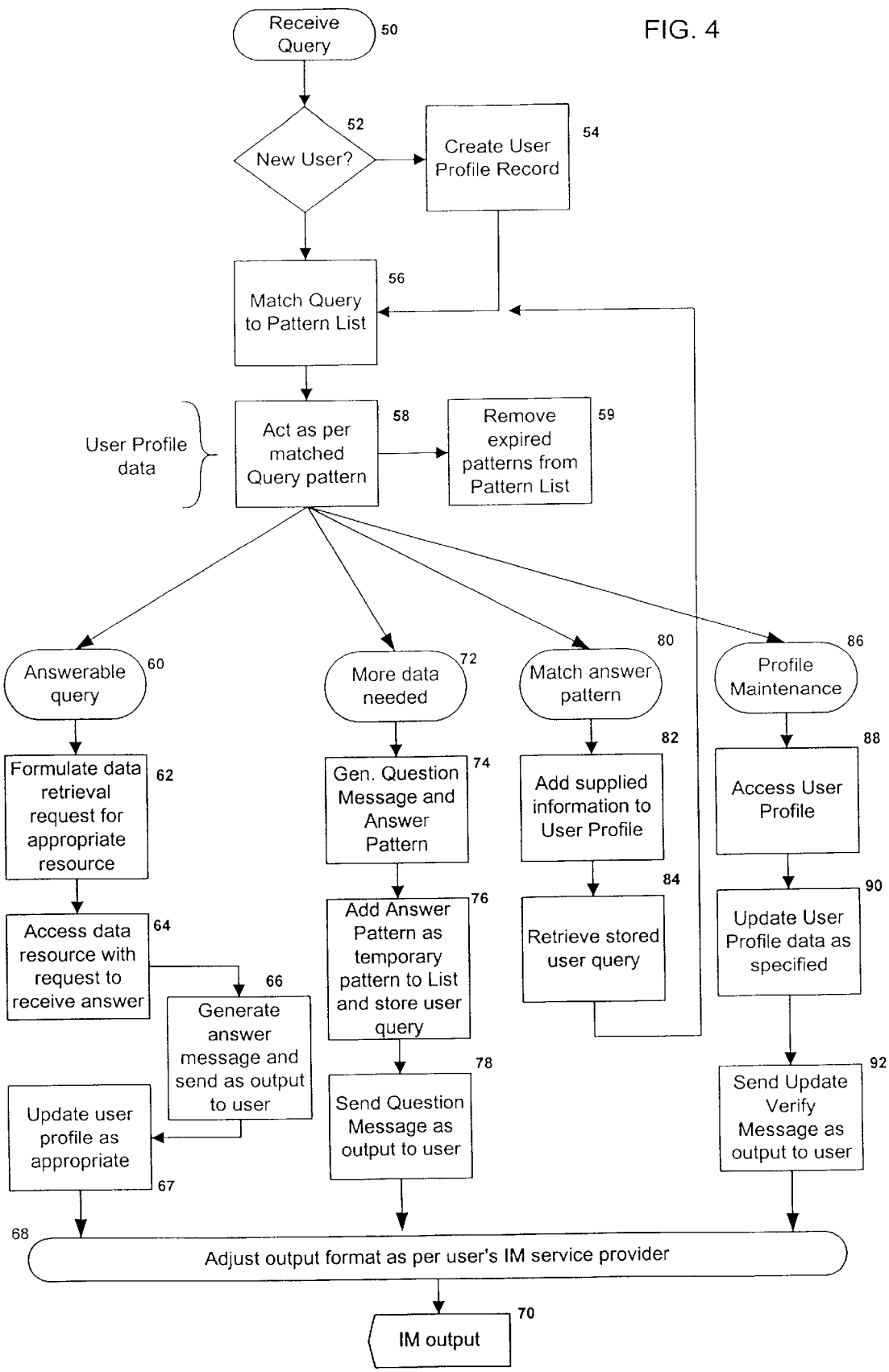
FIG. 4 is a flow chart of various aspects of the operation of a message processor for use in the systems of FIGS. 1 and 2.

FIG. 4 is a flow chart showing the general operation of a message processor server 30, such as shown in FIG. 2. While this flow will be discussed with reference to the architecture shown in FIG. 2, many aspects of this technique are also applicable to controlling the message processor 12 and separate query response server 22 illustrated in FIG. 1. Turning to FIG. 4, the server waits to receive a query, request, or other communication from a user (step 50). A screen name or other ID associated with a received query is determined and a check is made to see if a user profile has already been associated with the user (step 52). If no profile is found (i.e., the communication is from a new user), a user profile record is created and stored in the profile database 24 (step 54). The received query is then interpreted and acted upon.

In a particular embodiment, the query is interpreted by comparing it to a list of predefined query patterns and identifying the pattern which most closely matches the received query. Once the query pattern is determined, the appropriate action is taken to answer the query or otherwise fulfill the request (step 58). As will be appreciated, certain queries may require secondary or additional information. This information may be present in the user profile. Accordingly, the user profile information is preferably made available to, and can be referenced by, the system which is interpreting and/or acting on an interpreted query, or request.

FIG. 4 illustrates four basic types of requests which can be received and acted upon. These types are exemplary in nature and it will be appreciated that other types of requests in different classifications can also be handled by adjusting the present system and method as required.

A first type of query is what can be considered to be an "answerable" query. in other words, this type of query can be answered without additional input from the user (although access to data in the user profile or another secondary source may be required). Following receipt of an answerable query (step 60) a data retrieval request is formulated as required for the appropriate data resource (step 62). If the data resource is local, the data resource is directly accessed as appropriate using the formulated request. If the data resource is remotely located, the resource request is formatted as required for the given resource and forwarded through an appropriate communication link, such as the Internet (step 64). After the answer is received or extracted from the data resource, an answer message is generated and configured to be sent the user as output. (Step 66). The user profile can also be updated, as appropriate, in accordance with any new or updated information garnered from the interaction.

Because various users may be connected to the system through IM providers which support incompatible display options, a presentation layer is preferably provided for adjusting the format of output messages in accordance with knowledge of the data formatting requirements for the user's particular IM service provider. In one embodiment, the presentation layer consists of a script processing mechanism somewhat similar to script processing provided by the XML language. Each message processed by the message server is initially formatted to include all formatting options for all supported IM systems. For example, the initial output message can contain both bold text and embedded URLs even though, e.g, one IM system supports bold text but not embedded links, while a second IM system supports embedded links but not bold text. During the output processing, the presentation layer determines the target IM system and its supported capabilities and/or formatting requirements. The unsupported or excess formatting is removed and the remaining message is adjusted, as needed, to be in a format suitable for the target IM system.

The output message, properly formatted as required, is then forwarded to the user through the IM gateway 16 (step 70). Alternatively, or in addition, the output can be directed to an additional or different address or device specified by the user, either in the particular received query, in a prior query, or as a field in the user profile.

Certain queries received by the user will not be answerable without additional data. For example, a user may submit a query inquiring about "the weather" without specifying a geographic area. In the event that such a query is received, a determination is made regarding the type of data which is missing and (provided the information is not already in the user's profile) a question message soliciting this information from the user is generated (steps 72, 74).

In one embodiment, a separate subroutine is initiated during which the system assumes that the next communication from the user will be a response to the query message and the data in the response will be stored and used as appropriate. (Not shown). Preferably, however, the particular answer pattern associated with the generated questions is added as a temporary pattern to the query list and is associated with the particular user (step 76). The more-data-needed query can also stored in the user profile for later use. In this manner, and as discussed further below, a response to the generated question can be detected without requiring additional and separate data processing routines which limit the responsive actions which can be taken by the user. Finally, the question message is configured as output to the user (step 78) and forwarded through the output presentation layer and the IM gateway (steps 68, 70).

Preferably, answer patterns are added as temporary query patterns and expire within a designated period of time. Thus, a process can be initiated on a periodic basis to remove expired patterns from the pattern list (step 59). In addition, temporary patterns associated with a given user are also preferably removed when a subsequent communication from that user is received, regardless of whether the communication matches the query or not. This allows a user to abandon a query which requires more data and simply issue a new query (which will not match the temporary pattern).

By storing an answer pattern as a temporary pattern at the beginning of the query pattern list, the system can easily and quickly identify user communications which are responses to a data needed question. When a response matches an answer pattern (step 80) the information returned by the user is extracted and added to the appropriate fields in the user profile (step 82). The original user query which spawned the "more data needed question" is then retrieved from the user profile and reissued as if were just received from the user. During this second attempt, the required information can be retrieved from the user profile and the user's query executed without interruption (steps 84, 56). In the event that further secondary or additional information is required, the data solicitation procedure can repeat until the query is answerable or a failure condition is recognized.

In addition to issuing queries to request information, a user can issue requests to perform maintenance of their profile. For example, a user can request that the system add a designated number of stock shares to their profile for tracking purposes. Profile maintenance commands can be identified through general natural language processing, such as query pattern matching or can be identified through particular introductory key words, such as "PROFILE:", which indicates that the request is a profile update and not a general informational query. When a profile maintenance request is detected (step 86) the appropriate user profile is accessed (step 88). The user profile is then updated in accordance with the user specification (step 90). Finally a message indicating the success or failure of the update can be generated and forwarded to the user (steps 92, 68, 70).

Various other types of user queries may also be received in addition to those specified in FIG. 4. Other types of requests which can be processed in accordance with the present invention include, for example, a request to control a device connected to the Internet, a request to schedule a reminder, a request to send a message to a third party by a wireless messaging service, and a request to purchase particular goods or commodities. The specific implementation details are request-type dependent. The particular techniques and interface protocols required to process these types of requests will vary according to the implementation and platform technology. Various response techniques will be known to those of skill in the art and will therefore not be discussed further herein.

Figure 5:
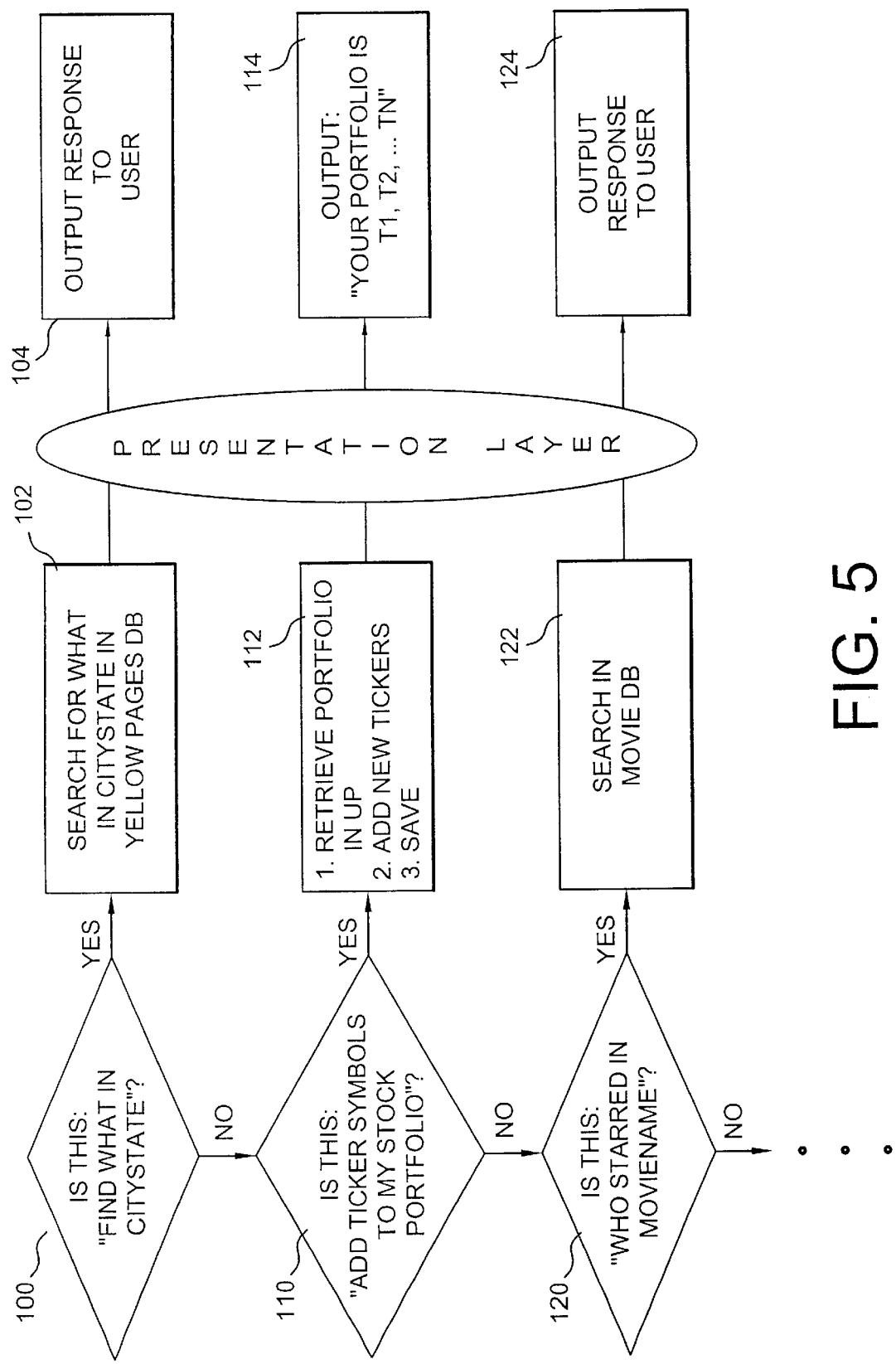
FIG. 5 is a flow chart illustrating one technique of interpreting requests received from a user.

FIG. 5 is an excerpt from a sample query pattern list which is written in a flow- chart style and which illustrates the association between particular queries and designated actions. For example, a first query pattern 100 can be of the form "Find <WHAT> in <CITYSTATE>". If this query pattern is detected, the designated response (block 102) is to search for the identified "what" in the identified "citystate" using, for example, a yellow pages database. The results of the search are then processed by the presentation layer and output to the user.

A second pattern 110 is of the form "Add <TICKERSYMBOL> to my portfolio". When this query pattern is detected, the request is interpreted as a profile maintenance request. As indicated at block 112, the designated response is to retrieve the ticker portfolio from the user's profile, add the specified stock ticker symbols to the portfolio, and save the result. The response 114 to the user is here designated as a listing of the contents of the updated portfolio.

Finally, a query can be of a generic informational request, such as the third pattern 120 "Who starred in <MOVIENAME>". The associated action 122 is to search a designated movie database to retrieve the stars of the specified movie. This information is then output as a response 124 to the user. As will be appreciated, once a sufficiently complete query pattern list has been generated, a wide variety of common user requests can easily be processed without manual input. A query pattern list of this type can be implemented in a variety of fashions. In one embodiment, the query patterns are implemented as PERL regular expressions statements which are processed according to conventional techniques. In an alternative embodiment, the language processing routines are written in C (or a variant of C) using language processing algorithms known to those of skill in the art.

As will be appreciated, during various interactions between users and the system, the user may be required to enter or review a relatively large amount of data. It may not be practical to implement this data access and retrieval through an instant messaging protocol. Thus, under particular circumstances, the system may establish a designated web page into which the data can be entered or from which the data can be retrieved. As shown in FIG. 2, the message server can then make the web page available to the user through over a conventional web server 36.

It is desirable to provide some measure of security when communicating data in this fashion. Otherwise, an unauthorized user could gain access to a user's profile. According to a particular aspect of the invention, the system leverages the security which is provided when users are required to login to an IM system using a password to thereby provide at least authenticated access to a designated web page.

Figure 6A:
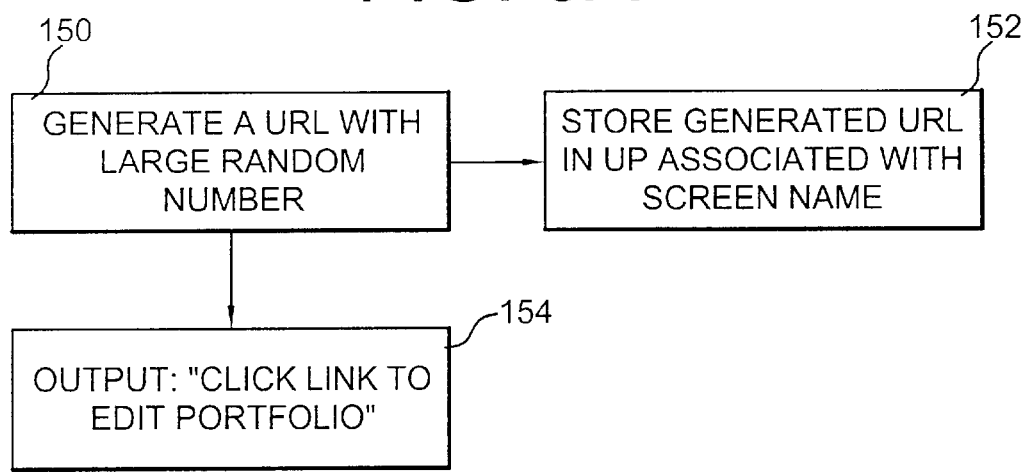
FIG. 6 is a flow chart illustrating a method of providing authenticated access to a web page via an instant messaging link.
Figure 6B:
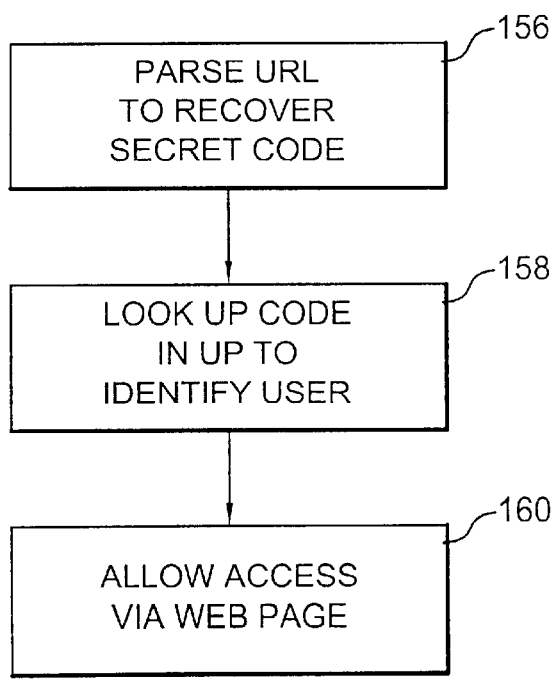
Figure 7:
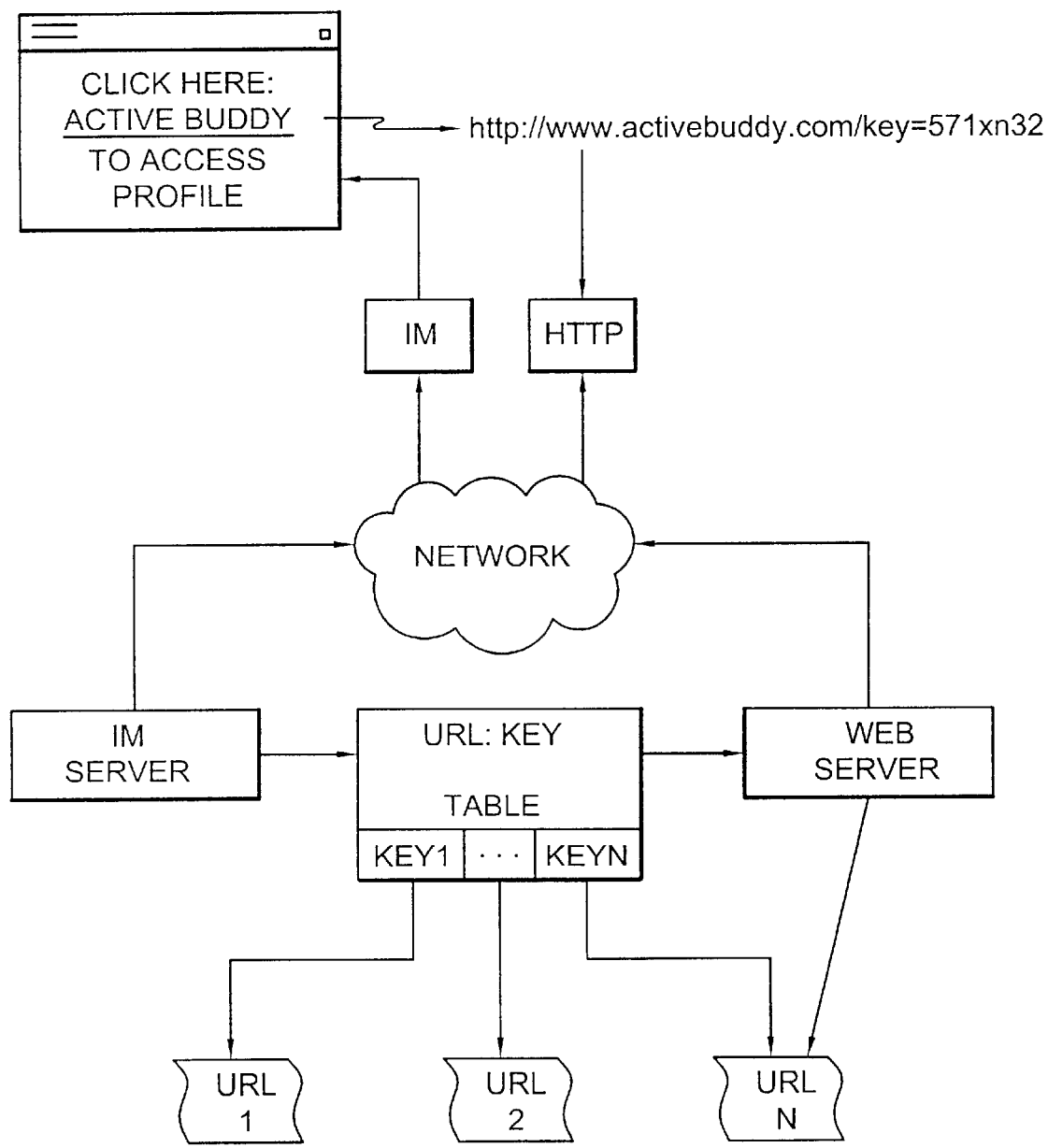
FIG. 7 is a diagram of a system implementing the technique illustrated in FIG. 6.

With reference to the flow chart of FIG. 6 and the block diagram of FIG. 7, when the server is acting to provide authenticated access to a particular web page, an access key is first generated. (Step 150). The access key preferably is a random number of sufficient length to make it difficult to determine without access to the random number generator's starting seed. A uniform resource locator (URL) is then generated which includes the new access key and which is associated with the selected web page. (Step 152). The generated URL is then forwarded to the user using the instant messaging protocol. (Step 154). A table can be generated which associates a given key with a particular web page, such as shown in FIG. 7. When the server receives a request from a remote user to access a particular web page, the URL provided by the user in the request is processed to extract a received access key. (Step 156). The access key is then used to determine the particular web page which is associated with that key (step 158) and the user is allowed access to the designated page. (Step 160).

By limiting the duration in which the key-web page association is valid, the likelihood of a third party intercepting the communication and accessing the identified web page is minimized. Further security can be provided by associating keys with particular users and allowing access to the associated page only if the key is returned by the user to which it was originally sent. Because the user is required to sign into the IM system, a user cannot access a web page through the server without first logging in through an IM network and thereby entering a user ID and password.

Advantageously, this method of providing access to a particular web page piggybacks on the security provided in the instant messaging login routine and provides some additional measure of security without requiring the user to provide their instant messaging password to the request processing system. In addition, further security can be provided by invalidating the key-web page association once a user has successfully accessed the page (within the designated time period). In this manner, only a single user can access a page. If hits from multiple users are detected during the key validity period, it can be assumed that the transmission security has been compromised and access denied to all users or appropriate alternative actions taken.

Various different programmable computer hardware platforms can be used to implement the several aspects of the present invention. In a most preferred embodiment, the various components, such as message routers, dispatcher, query response servers, etc., are implemented on one or more computer systems which are substantially identical at the hardware and operating system level. This simplifies interactivity between the various systems and makes it simpler to port functionality from one computer to another to distribute the workload in accordance with, e.g., the number of computer systems available. The computers should be connectable to each other, for example, by means of 100Base-T Ethernet interfaces and corresponding 100Base-T Ethernet switches. At least one of the computers is connected to the data network. In the preferred Internet implementation, the connection is through a firewall and via a 100Base-T connection provided by a data center. In the most preferred implementation, each computer contains an a Intel L440GX+ motherboard, two Pentium III processors, 512 MB RAM, two Seagate 9 GB disk drives, and operates using the Unix compatible Linux operating system. As will be appreciated, the specific hardware utilized can be varied in accordance with need, required capacity, and the preferred programming and operating environment, as well as in response to other. factors.

The invention has been particularly shown and described with reference to the preferred embodiments thereof. It will be understood by those of skill in the art that various changes and additions to the method and system described above can be made without departing from the spirit and scope of the invention.

What is claimed is:

1. A method for interactively responding to queries from a user logged in to an instant messaging network, comprising the steps of:

logging a message processor in to the instant messaging network under a first screen-name, the user having the first screen-name as an authorized partner and being advised by the instant messaging network of the presence of the message processor;

receiving a query addressed to the first screen-name from the user via the instant messaging network in an instant messaging protocol;

parsing the query to extract the request; evaluating the request in the message processor formulating an answer to the user's query on the basis of the evaluated request;

generating an output message containing the answer; and sending the output message to the user via the instant messaging network.

2. The method of claim 1, wherein the output message is sent to the user through the instant messaging network in the instant messaging protocol.

3. The method of claim 1, wherein the step of formulating an answer comprises:

passing the query to a query response server; and receiving the answer from the query response server.

4. The method of claim 3, further comprising the steps of:

accessing a profile associated with the user from a profile database; and making at least a portion of the accessed profile available to the query response server.

5. The method of claim 4, further comprising the steps of, upon, if no profile is available:

creating a profile associated with the user; and storing the profile in the profile database.

6. The method of claim 5, wherein the step of creating comprises the steps of:

soliciting profile information from the user and storing profile information provided by the user in the profile.

7. The method of claim 6, wherein the step of soliciting comprises sending the user a cross-reference message in the instant messaging protocol directing the user to a web page configured to receive user input.

8. The method of claim 7, wherein the cross-reference message includes an embedded URL, the URL containing a key associated with the web page.

9. The method of claim 3, further comprising the steps of receiving a notification from the query response server requesting additional data;

soliciting the requested additional data frown the user;

upon receipt of the additional data from the user, making the received additional data available to the query response server.

10. The method of claim 9, further comprising the step of saving the received additional data in a profile associated with the user.

11. The method of claim 3, further comprising the steps of:

receiving a notification from the query response server requesting additional data;

accessing a profile associated with the user;

extracting the requested additional data from the user; and making the additional data available to the query response server.

12. The method of claim 11, further comprising the steps of, in the event that the requested additional data is not in the accessed profile:

soliciting the requested additional data from the user; and saving the additional data in the profile.

13. The method of claim 1, including the additional steps of:

generating a new access key;

creating a secret URL including the new access key;

associating the secret URL with a selected web page; and sending the secret URL to the first user in a message using the instant messaging protocol.

14. The method of claim 13, further comprising the steps of:

receiving an access request from a second user using a hyper-text transfer protocol, the access request including a designated URL;

parsing the designated URL to extract a received access key;

identifying a designated web page associated with the received access key; and allowing access by the second user to the designated web page.

15. The method of claim 14, wherein the first user and the second user are the same.

16. The method of claim 14, wherein the selected web page and the designated web page are the same.

17. The method of claim 14, wherein the association between the new access key and the selected web page is valid only for a predetermined period of time.

18. The method of claim 14, further comprising the step of invalidating the association between the new access key and the selected web page when the designated web page is the selected web page.

19. The method of claim 14, further comprising the step of storing at least a portion of the secret URL in a profile associated with the first user, the portion including the new access key;

the step of identifying comprising accessing a user profile associated with the second user;

the step of allowing access comprising access by the second user to the designated web page only if the received access key is in the user profile associated with the second user.

20. The method of claim 14, further comprising the steps of:
   storing the association between the new access key and the selected web page in a reference table;
   the step of identifying comprising accessing the reference table to retrieve the designated web page associated with the received access key.

21. The method of claim 20, further comprising the steps of:
   associating the first user with the new access key;
   the step of allowing access comprising allowing access by the second user to the designated web page only if the second user is associated with the received access key.

22. A method for interactively responding to requests from a user logged in to an instant messaging network, comprising the steps of:
   logging a message processor in to the instant messaging network under a first screen-name, the user having the first screen-name as an authorized partner and being advised by the instant messaging network of the presence of the message processor;
   receiving a message addressed to the first screen-name containing a request from the user via the instant messaging network in an instant messaging protocol;
   parsing the message to extract the request;
   evaluating the request to identify at least one designated action suitable for fulfilling request;
   performing the at least one designated action;
   generating an output message containing results of the performance of the designated action; and
   sending the output message to the user via the instant messaging network.

23. The method of claim 22, wherein the output message is sent to the user through the instant messaging network in the instant messaging protocol.

24. The method of claim 22, wherein, in the event that the request is a query for information:
   the at least one designated action comprises passing the query to a query response server; and
   the results comprise an answer received from the query response server.

25. The method of claim 22, further comprising the steps of:
   parsing the message to extract a user ID;
   accessing a profile associated with the user ID, the profile containing information; and
   making at least some of the information in the accessed profile available for use during at least one of the evaluating and performing steps.

26. The method of claim 25, wherein, in the event that the request is a request for profile maintenance, the at least one designated action comprises accessing a user profile associated with the user and updating the user profile as specified in the request.

27. The method of claim 25, wherein the results comprise an indication regarding the success of the profile update.

28. The method of claim 25, wherein the step of evaluating comprises:
   determining if secondary information is required to fulfill the request; and
   accessing the user profile to retrieve the secondary information.

29. The method of claim 28, wherein the step of evaluating further comprises, in the event that the secondary information is not in the user profile, soliciting the secondary information from the user.

30. The method of claim 29, further comprising the step of, upon receipt of the secondary information, saving the secondary information in the profile.

31. A system for interactively responding to queries from a user logged in to an instant messaging service via an instant messaging network, comprising:
   a message processor logged in to the instant messaging service under a first screen-name via the instant messaging network, the user having the first screen-name as an authorized partner and being advised by the instant messaging service of the presence of the message processor;
   the message processor configured to:
      receive an instant message query addressed to the first screen-name from the user;
      parsing the message query to extract the request; evaluating the request in the message processor formulate an answer to the user's query on the basis of the evaluated request;
      generate an output message containing the answer; and
      send the output message to the user via the instant messaging network.

32. The system of claim 31, wherein the message processor is further configured to send the output message to the user in an instant message protocol via the network.

33. The system of claim 31, wherein the message processor is connected to a query response server, the message processor being configured to formulate an answer by passing the query to the query response server and receiving the answer from the query response server.

34. The system of claim 33, further comprising a user profile database containing information associated with a plurality of users;
   the message processor being configured to access a profile associated with the user from the profile database and make at least a portion of the accessed profile available to the query response server during answer formulation.

35. The system of claim 33, wherein the message processor is configured to, if no profile is available, create a profile associated with the user and store the profile in the profile database.

36. The system of claim 35, wherein the message processor is configured to create a profile by soliciting profile information from the user and storing profile information provided by the user in the profile.

37. The system of claim 35, wherein the message processor is configured to solicit profile information by sending the user an instant message containing a cross-reference link directing the user to a web page configured to receive user input.

38. The system of claim 37, wherein the cross-reference link includes an embedded URL, the URL containing a key associated with the web page.

39. The system of claim 31, wherein the message processor is configured to:
   receive a notification from the query response server requesting additional data;
   solicit the requested additional data from the user in response to the receipt of an additional data notification; and
   make received additional data available to the query response server.

40. The system of claim 39, wherein the message processor is configured to save the received additional data in a profile associated with the user.

41. The system of claim 31, wherein the message processor is further configured to:
- receive a notification from the query response server requesting additional data;
- access a profile associated with the user;
- extract the requested additional data from the user; and
- make the additional data available to the query response server.

42. The system of claim 41, wherein the message server is configured to, if the requested additional data is not in the accessed profile, solicit the requested additional data from the user and save the additional data in the profile.

43. The system of claim 31, further comprising:
- a web server connected to the network; and
- a key-web page association table indicating an association between a specific key and a designated URL;
- the message processor being further configured to, in response to a determination that a user is to be granted authenticated access to a selected web page:
  - generate a new access key,
  - create a secret URL including the new access key;
  - associate the secret URL with the selected web page in the key-web page association table; and
  - send the secret URL to the first user in an instant message;
- the web server configured to, in response to the receipt of a web-page access request from a second user, the access request including a designated URL:
  - parse the designated URL to extract a received access key,
  - identify a designated web page associated with the received access key in accordance with data in the key-web page association table; aid
  - serve the designated web page to the second user.

44. The system of claim 43, wherein the association between- the new access key and the selected web page is valid only for a predetermined period of time.

45. The system of claim 43, wherein the web server is configured to invalidate the association between the new access key and the selected web page when the designated web page is the selected web page.

46. A system for interactively responding to requests from a user logged in to an instant messaging network, comprising:
- a message processor logged in to the instant messaging service under a first screen-name via the instant messaging network, the user having the first screen-name as an authorized partner and being advised by the instant messaging service of the presence of the message processor;
- the message processor configured to:
  - receive an instant message addressed to the first screen-name containing a request from the user via the instant messaging network;
  - parse the message to extract the request;
  - evaluate the request to identify at least one designated action suitable for fulfilling request;
  - perform the at least one designated action;
  - generate an output message containing results of the performance of the designated action; and
  - send the output message to the user via the instant messaging network.

47. The system of claim 46, wherein the message processor is configured to send the output message to the user in an instant message protocol.

48. The system of claim 46, wherein the message processor is configured to respond to a query for information by passing the query to a query response server and receiving an answer from the query response server.

49. The system of claim 46, further comprising a user profile database;
- the message processor being further configured to:
  - parse the message to extract a user ID;
  - access a profile associated with the user ID, the profile containing information; and
  - make at least some of the information in the accessed profile available for use during request evaluation and action performance.

50. The system of claim 49, wherein the processor is configured to respond to a profile maintenance request by accessing a user profile associated with the user and updating the user profile as specified in the request.

51. The system of claim 49, wherein the message processor is configured to determine if secondary information is required to fulfill the request and, if so, access the user profile to retrieve the secondary information.

52. The system of claim 51, wherein the message processor is further configured to solicit the secondary information from the user if the secondary information is not in the user profile.

53. The system of claim 52, wherein the message processor is configured to save received secondary information in the user profile.

* * * * *

(12) EX PARTE REEXAMINATION CERTIFICATE (7316th)
United States Patent
Kay et al.

(10) Number: US 6,430,602 C1
(45) Certificate Issued: Jan. 12, 2010

(54) METHOD AND SYSTEM FOR INTERACTIVELY RESPONDING TO INSTANT MESSAGING REQUESTS

(75) Inventors: Timothy Kay, Los Altos, CA (US); Robert Hoffer, Allendale, NJ (US)

(73) Assignee: Active Buddy, Inc., New York, NY (US)

Reexamination Request:
No. 90/006,882, Dec. 8, 2003

Reexamination Certificate for:
Patent No.: 6,430,602
Issued: Aug. 6, 2002
Appl. No.: 09/643,262
Filed: Aug. 22, 2000

(51) Int. Cl.
*H04L 29/06* (2006.01)

(52) U.S. Cl. .................. 709/206; 707/3; 707/4; 707/5; 707/9; 707/10; 707/E17.109; 709/202; 709/207; 709/225; 709/226; 718/104; 718/105

(58) Field of Classification Search .......... None
See application file for complete search history.

(56) References Cited

U.S. PATENT DOCUMENTS

| | | | |
|---|---|---|---|
| 5,764,916 A | | 6/1998 | Busey et al. |
| 5,990,887 A | | 11/1999 | Redpath et al. |
| 6,192,394 B1 | | 2/2001 | Gutfreund et al. |
| 6,192,407 B1 | | 2/2001 | Smith et al. |
| 6,259,969 B1 | * | 7/2001 | Tackett et al. ............ 700/264 |
| 6,314,410 B1 | * | 11/2001 | Tackett et al. ............ 706/11 |
| 6,346,952 B1 | | 2/2002 | Shtivelman |
| 6,363,301 B1 | * | 3/2002 | Tackett et al. ............ 700/246 |
| 6,442,590 B1 | | 8/2002 | Inala et al. |
| 6,446,112 B1 | | 9/2002 | Bunney et al. |
| 6,549,937 B1 | | 4/2003 | Auerbach et al. |
| 6,604,090 B1 | * | 8/2003 | Tackett et al. ............ 706/11 |
| 6,629,087 B1 | * | 9/2003 | Benson et al. ............ 706/11 |
| 6,629,136 B1 | * | 9/2003 | Naidoo ............ 709/219 |
| 6,668,169 B2 | | 12/2003 | Burgan et al. |
| 6,678,673 B1 | | 1/2004 | Eves et al. |
| 6,678,720 B1 | | 1/2004 | Matsumoto et al. |
| 6,691,162 B1 | | 2/2004 | Wick |
| 6,741,855 B1 | * | 5/2004 | Martin et al. ............ 455/419 |

OTHER PUBLICATIONS

*Chghid.pl Script*, Gamma Burst, Inc., www.gamma–burst.com/members/chghid.pl.txt, pp. 1–4, Aug. 1998.*
Bone, J., *RVP Schemas*, draft–dusseault–rvp–schema–00.txt, IETF, pp. 1–14, Mar. 1998.*
Bermant, C., *In the Fast Lane Instant Messaging*: Seattle Times, p. C.1, pp. 1–4 as printed, Aug. 22, 1999.*
Lozano, Fernando, Introduction to Relational Database Design, EDM/2, www.edm2.com/0612/msql7.html, pp. 1–14, Dec. 1998.*
Hidden Page Setup, Gamma Burst, Inc., www.gamma–burst.com/tutorial/gvset.html, pp. 1–2, Jan. 11, 2000.*
Kyheroinen, P., Transactions, www.niksula.cs.hut.fi/~patze/secur_sem.html, pp. 1–16, Nov. 1996.*
Netscape AOL Instant Messenger: Quick Tips for Getting Started, www.aim.com/netscape/quiktips.html, pp. 1–5, Jun. 1998.*
Fiedler, D., *Activerse Releases Dingbot SDK Beta*, www.internetnews.com/dev–news/print.php/54661, pp. 1–3, Aug. 10, 1998.*
Coleman, P., *Something to Talk About*, webserver.cpg.com/features/f2/2.11/ pp. 1–5, Dec. 1997.*

(Continued)

*Primary Examiner*—Andrew Caldwell

(57) ABSTRACT

A method and system for interactively responding to queries from a remotely located user includes a computer server system configured to receiving an instant message query or request from the user over the Internet. The query or request is interpreted and appropriate action is taken, such as accessing a local or remote data resource and formulating an answer to the user's query. The answer is formatted as appropriate and returned to the user as an instant message or via another route specified by the user. A method and system of providing authenticated access to a given web page via instant messaging is also disclosed.

Amended

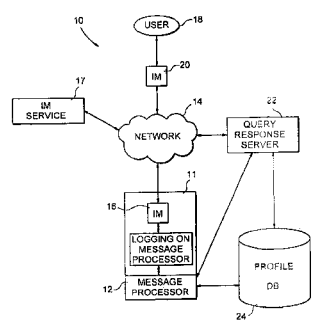

OTHER PUBLICATIONS

Triumph *PC Press Releases*, triumppc.com/PressMedia, pp. 1–7, various dates.*

Stenvold, L., User Experiences of Work Group Awareness Information Provided By a Buddy List Application, Telenor Research and Development, report TFoU R21/99, pp. 1–20, Aug. 8, 1999.*

Day, M., et al., A Model for Presence and Instant Messaging, RFC–2778, IETF, pp. 1–15, Feb. 2000.*

Hetzel, P, IM on Your Radar, PC World, http://www.pcworld.com/resource/printable/article/0,aid,7401,00.asp, pp. 1–8, Jul. 13, 1998.*

Mohr, G., WhoDP & Activerse Ding!, www.isr.uci.edu/events/twist/wisen98/presentations/Mohr, pp. 1–16, Jul. 16, 1998.*

De Angeli, A., et al., The Unfriendly User: exploring social reactions to chatterbots, Proc. of the Int'l. Conf. on Affective Human Factors Design, Asean Academic Press, pp. 1–8 (as printed), 2001.*

Mohr, G., WhoDP: Widely Hosted Object Data Protocol, draft–hohr–whodp–oo.txt, Internet Draft, IETF, pp. 1–33, Mar. 2, 1998.*

An Odyssey: From Book Fiction to Internet Chatter, www.nytimes.com/library/tech/99/03/circuits/articles/18time.html, pp. 1–2 (as printed), Mar. 18, 1999.*

Kahney, L., Hello AOL, I'm Listening, Wired News, www.wired.com/news/print/0,1294,38517,00.html, pp. 104 (as printed), Sep. 1, 2000.*

Fury, K., AOLiza, www.fury.com/topics/aoliza, pp. 1–12 (as printed), downloaded Dec. 13, 2004.*

Current Meeting Report, IMPP Working Group, www.ietf.org/proceedings/98dec/43rd–ietf–98dec–37.html, pp. 1–13 (as printed), Dec. 7, 1998.*

Eggdrop History. [online] Eggdrop Archives. [Retrieved on Oct. 31, 2002]. Retrieved from the Internet: <URL: http://eggdrops.net/eggdrophistory.html>. (1 pg.).

"DingBot SDK", Version 1.0, 1998. [online] Ding! [Retrieved on Aug. 23, 2002]. Retrieved from the Internet. (5 pgs.).

News and New Product Briefs. [online]. Javaworld.com [Retrieved on Aug. 10, 2004]. Retrieved from the Internet: <URL: http://javaworld.com/javaworld/jw–10–1998/jw–10–newsbriefs_p.html>. (3 pgs.).

Activerse and ObjectsSpace Join for Java–Enhanced DingBots. [online]. Internetnews. [Retrieved on Aug. 10, 2004]. Retrieved from the Internet: <URL: http://www.internetnews.com/dev–news/print.php/54941. (3 pgs.).

New and New Product Briefs (Feb. 15, 1998). [online]. Javaworld. [Retrieved on Aug. 10, 2004]. Retrieved from the Internet: <URL: http://javaworld.com/javaworld/jw–03–1998/jw–03–newsbriefs_p.htm> (27 pgs.).

CS 596 Java Programming Fall Semester, 1998 Dingl. [online]. San Diego State University. [Retrieved on Aug. 10, 2004]. Retrieved from the Internet: <URL: http://www.eli.sdsu.edu/courses/fall98/cs596/ding/> (1 pg.).

PCT Notification of the International Search Report or the Declaration, 4 pgs.

Instant Informer Home. [online]. AOL. [Retrieved on Aug. 23, 2002]. Retrieved from the Internet: <URL: http://members.aol.com/instantinform/?mtbrand=AOL_US> (15 pgs).

Kevin Fox~fury.com, [online]. Retrieved from the Internet: <URL: http://fury.com/aoliza/> Aug. 15, 2002 (7 pgs.).

Activerse Releases DingBot SDK, Implementing Presence Applications with Ding!, 1998. [online]. GTT Communications [Retrieved on Feb. 7, 2005]. Retrieved from the Internet: <URL: http://www.web.archive.org/web/19991007025413/www.activerse.com/press/pr/press024.html (3 pgs.).

The Student Information Processing Board, Abbe Cohen, "Inessential Zephyr" (Aug. 23, 1993) ("Inessential Zephyr"); http://www.mit.edu/afs/sipb/project/doc/izephy/html/izephyr.html; http://www.mit.edu/afs/sipb/project/doc/izephyr/html.1993.

The Tech, Naveen Sunkavally and Gabriel Daleson, "Using MIT's Athena Computing System" (Sep. 2, 1999) ("The Tech"); http://www–tech.mit.edu/V119/N39/39athena.39n.html.

MIT Project Athena, "Zaway(1)", (Jul. 1, 1988), "Zaway (1)"), http://www.final.gov/docs/products/zephyr/zaway.html.

MIT Project Athena, "Zephyr(1)", (Jul. 1, 1988), ("Zephyr (1)"), http://www.final.gov/docs/products/zephyr/zephyr.html.

Index of /afs/sipb.mit.edu/service/logging/src/zephyr, (last modified Sep. 1, 1997), "Index #1"), http://www.mit.edu/afs/sipb.mit.edu/service/logging/src/zephyr.

Zaway.1, (last modified Sep. 23, 1988), "Zaway.1 code"), http://www.mit.edu.afs/sipb.mit.edu/service/logging/src/zephyr/clients/zaway/zaway.1.

Zaway.c, (last modified Jul. 7, 1995), "Zaway.c code"), http://www.mit.edu/afs/sipb:mit.edu/service/logging/src/zephyr/clients/zaway/zaway.c.

Carla J. Fermann, "Distributed Consulting in a Distributed Environment", Proceedings of the XVIII ACM conference on User services, 1990, ("Distributed Consulting").

Sharon Belville and Dan Pop, "Zephyr at Cern," (Version 1.0, Jul. 15, 1993), ("Zephyr at Cern"), http://consult.cern.ch/writeup/zephyr/main.html.

Robert S. French and John T. Kohl, "The Zephyr Programmer's Manual", (Apr. 5, 1989), ("Zephyr programmer's manual").

* cited by examiner

Amended
FIG. 1
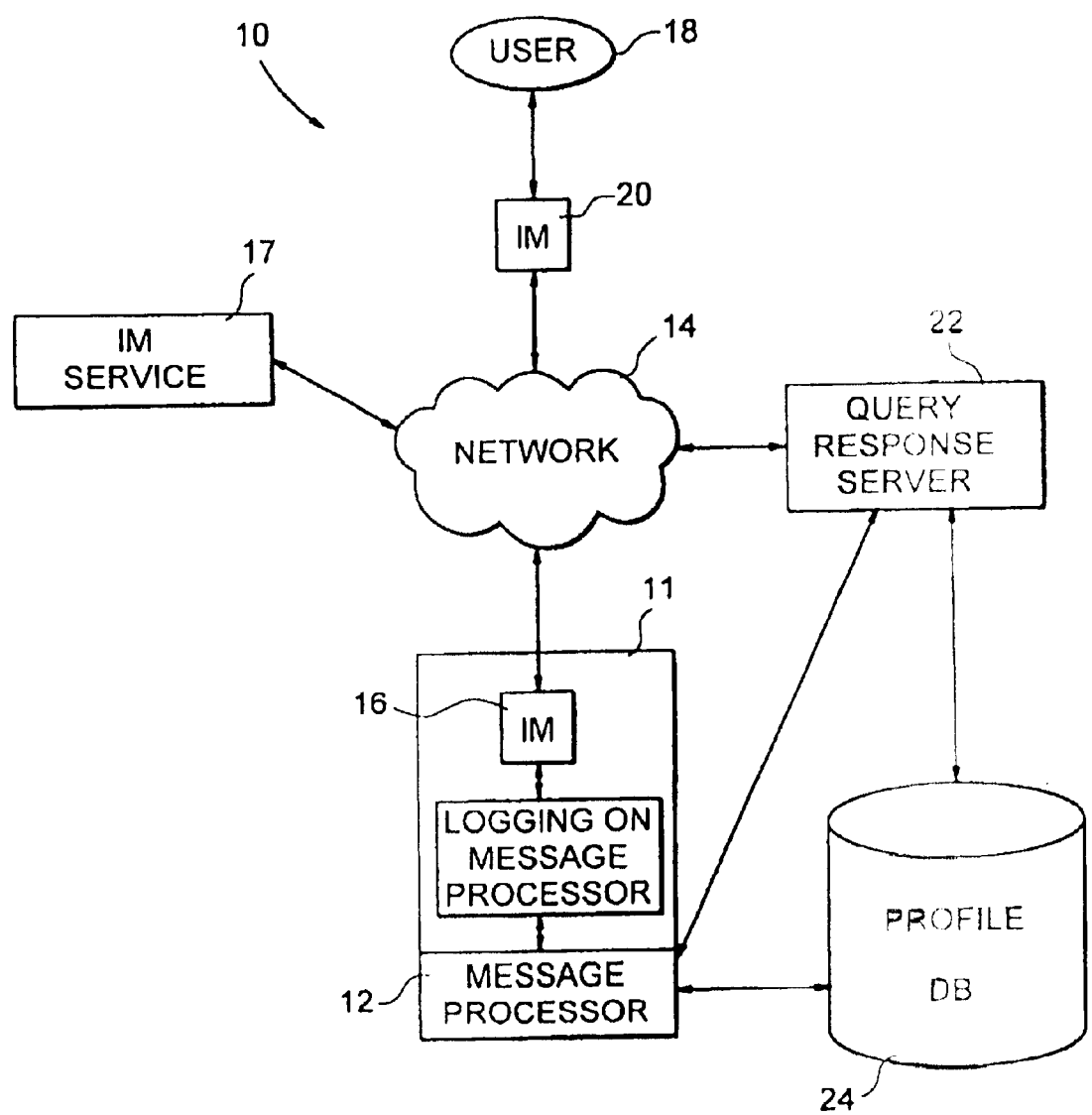

Amended
FIG. 2
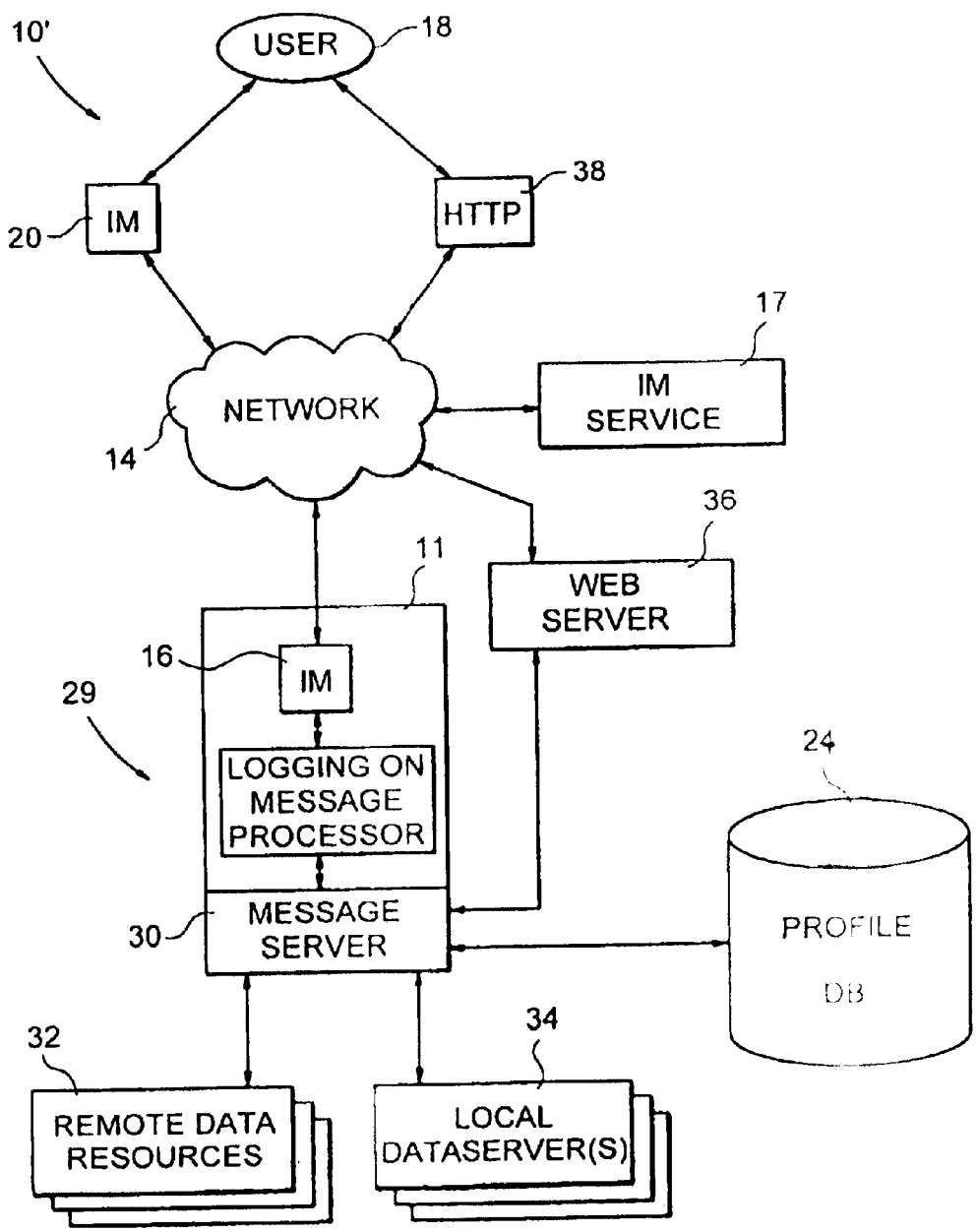

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

THE DRAWING(S) HAVE BEEN CHANGED AS
FOLLOWS:

Added "LOGGING ON MESSAGE PROCESSOR" box to both figures.

AS A RESULT OF REEXAMINATION, IT HAS BEEN DETERMINED THAT:

The patentability of claims 7, 8, 19–21, 26, 27, 37, 38, 43–45, and 50 is confirmed.

Claims 1–6, 9–18, 22–25, 28–36, 39–42, 46–49, and 51–53 are cancelled.

New claims 54–86 are added and determined to be patentable.

*54. A method for interactively responding to queries from a user logged in to an instant messaging network, comprising the steps of:*

*logging a message processor in to the instant messaging network as another user under a first screen-name by entering a name for the message processor, the user having the first screen-name as an authorized partner and being advised by the instant messaging network of the presence of the message processor;*

*receiving a query addressed to the first screen-name from the user via the instant messaging network in an instant messaging protocol;*

*parsing the query to extract the request;*

*evaluating the request in the message processor, including accessing a profile associated with the user from a profile database, and making at least a portion of the accessed profile available to a query response server, wherein if no profile is available, creating a profile associated with the user, including soliciting profile information from the user by sending the user a cross-reference message in the instant messaging protocol directing the user to a web page configured to receive user input, and storing profile information provided by the user in the profile and storing the profile in a profile database;*

*formulating an answer to the user's query on the basis of the evaluated request by passing the query to the query response server, and receiving the answer from the query response server;*

*generating an output message containing the answer; and*

*sending the output message to the user via the instant messaging network.*

*55. The method of claim 54, wherein the output message is sent to the user through the instant messaging network in the instant messaging protocol.*

*56. The method of claim 54, wherein the cross-reference message includes an embedded URL, the URL containing a key associated with the web page.*

*57. The method of claim 54, further comprising the steps of: receiving a notification from the query response server requesting additional data; soliciting the requested additional data frown the user; upon receipt of the additonal data from the user, making the received additional data available to the query response server.*

*58. The method of claim 57, further comprising the step of saving the received additional data in a profile associated with the user.*

*59. The method of claim 54, further comprising the steps of:*

*receiving a notification from the query response server requesting additional data;*

*accessing a profile associated with the user;*

*extracting the requested additional data from the user; and*

*making the additional data available to the query response server.*

*60. The method of claim 64, further comprising the steps of, in the event that the requested additional data is not in the accessed profile:*

*soliciting the requested additional data from the user; and*

*saving the additional data in the profile.*

*61. A method for interactively responding to requests from a user logged in to an instant messaging network, comprising the steps of:*

*logging a message processor into the instant messaging network as another user under a first screen-name by entering a name for the message processor, the user having the first screen-name as an authorized partner and being advised by the instant messaging network of the presence of the message processor;*

*receiving a message addressed to the first screen-name containing a request from the user via the instant messaging network in an instant messaging protocol;*

*parsing the message to extract the request and a user ID;*

*accessing a profile associated with the user ID, the profile containing information, at least some of which is made available during at least one of the evaluating and performing steps;*

*evaluating the request to identify at least one designated action suitable for fulfilling the request;*

*performing the at least one designated action, wherein, in the event that the request is a request for profile maintenance, the at least one designated action comprises a user profile associated with the user and updating the user profile as specified in the request;*

*generating an output message containing results of the performance of the designated action; and*

*sending the output message to the user via the instant messaging network.*

*62. The method of claim 61, wherein the output message is sent to the user through the instant messaging network in the instant messaging protocol.*

*63. The method of claim 61, wherein, in the event that the request is a query for information:*

*the at least one designated action comprises passing the query to a query response server; and*

*the results comprise an answer received from the query response server.*

*64. The method of claim 61, wherein the results comprise an indication regarding the success of the profile update.*

*65. The method of claim 61, wherein the step of evaluating comprises:* determining if secondary information is required to fulfill the request; and accessing the user profile to retrieve the secondary information.

66. The method of claim 65, wherein the step of evaluating further comprises, in the event that the secondary information is not in the user profile, soliciting the secondary informaton from the user.

67. The method of claim 66, further comprising the step of, upon receipt of the secondary information, saving the secondary information in the profile.

68. A system for interactively responding to requests from a user logged in to an instant messaging network, comprising:

a user profile database;

a message processor logged in to the instant messaging service under a first screen-name via the instant messaging network, the message processor logged in to the instant messaging service as another user by entering a name for the message processor, the user having the first screen-name as an authorized partner and being advised by the instant messaging service of the presence of the message processor;

the message processor configured to:

receive an instant message addressed to the first screen-name containing a request from the user via the instant messaging network;

parse the message to extract the request and a user ID;

access a user profile associated with the user ID, the user profile containing information, at least some of the information in the accessed user profile available for use during evaluation of the request and performance of the action;

evaluate the request to identify at least one designated action suitable for fulfilling the request;

perform the at least one designated action, wherein in the event that the request is a request for profile maintenance, the at least one designated action comprises accessing the user profile associated with the user ID and updating the user profile as specified in the request;

generate an output message containing results of the performance of the designated action; and send the output message to the user via the instant messaging network.

69. The system of claim 68, wherein the message processor is configured to send the output message to the user in an instant message protocol.

70. The system of claim 68, wherein the message processor is configured to respond to a query for information by passing the query to a query response server and receiving an answer from the query response server.

71. The system of claim 68, wherein the message processor is configured to determine if secondary information is required to fulfill the request and, if so, access the user profile to retrieve the secondary information.

72. The system of claim 71, wherein the message processor is further configured to solicit the secondary information from the user if the secondary information is not in the user profile.

73. The system of claim 72, wherein the message processor is configured to save received secondary information in the user profile.

74. A method for interactively responding to requests from a user logged in to an instant messaging network, comprising the steps of:

logging a message processor in to the instant messaging network as another user under a first screen-name by entering a name and password for the message processor to authenticate the message processor, the user having the first screen-name as an authorized partner and being advised by the instant messaging network of the presence of the message processor;

receiving a message addressed to the first screen-name containing a request from the user via the instant messaging network in an instant messaging protocol;

parsing the message to extract the request and a user ID;

accessing a user profile associated with the user ID, the profile containing information, at least some of which is made available for use during at least one of the evaluating and performing steps;

evaluating the request to identify at least one designated action suitable for fulfilling the request;

performing the at least one designated action, wherein, in the event that the request is a request for profile maintenance, the at least one designated action comprises accessing the user profile associated with the user ID and updating the user profile as specified in the request;

generating an output message containing results of the performance of the designated action; and sending the output message to the user via the instant messaging network.

75. The method of claim 74, wherein the output message is sent to the user through the instant messaging network in the instant messaging protocol.

76. The method of claim 74, wherein, in the event that the request is a query for information:

the at least one designated action comprises passing the query to a query response server;

the results comprise an answer received from the query response server.

77. The method of claim 74, wherein the results comprise an indication regarding the success of the profile update.

78. The method of claim 74, wherein the step of evaluating comprises:

determining if secondary information is required to fulfill the request;

and accessing the user profile to retrieve the secondary information.

79. The method of claim 78, wherein the step of evaluating futher comprises, in the event that the secondary information is not in the user profile, soliciting the secondary information from the user.

80. The method of claim 79, further comprising the step of, upon receipt of the secondary information, saving the secondary information in the profile.

81. A system for interactively responding to requests from a user logged in to an instant messaging network, comprising:

a user profile database;

a message processor logged in to the instant messaging service under a first screen-name via the instant messaging network, the message processor logged in to the instant messaging service as another user by entering a name and password for the message processor to authenticate the message processor, the user having the first screen-as an authorized partner and being advised by the instant messaging service of the presence of the message processor; the message processor configured to:

receive an instant message addressed to the first screen-name containing a request from the user via the instant messaging network;

parse the message to extract the request and a user ID;
access a user profile associated with the user ID, the profile containing information, at least some of the information in the accessed profile being made available for use during processing;
evaluate the request to identify at least one designated action suitable for fulfilling the request;
perform the at least one designated action;
generate an output message containing results of the performance of the designated action; and
send the output message to the user via the instant messaging network; and wherein the message processor is further configured to:
   respond to a profile maintenance request by accessing the user profile associated with the user ID and updating the user profile as specified in the request.

82. The system of claim 81, wherein the message processor is configured to send the output message to the user in an instant message protocol.

83. The system of claim 81, wherein the message processor is configured to respond to a query for information by passing the query to a query response server and receiving an answer from the query response server.

84. The system of claim 81, wherein the message processor is configured to determine if secondary information is required to fulfill the request and, if so, access the user profile to retrieve the secondary information.

\* \* \* \* \*